March 13, 1962 W. G. RUMBLE 3,025,411
DRIVE CIRCUIT FOR A COMPUTER MEMORY
Filed May 23, 1960 2 Sheets-Sheet 1
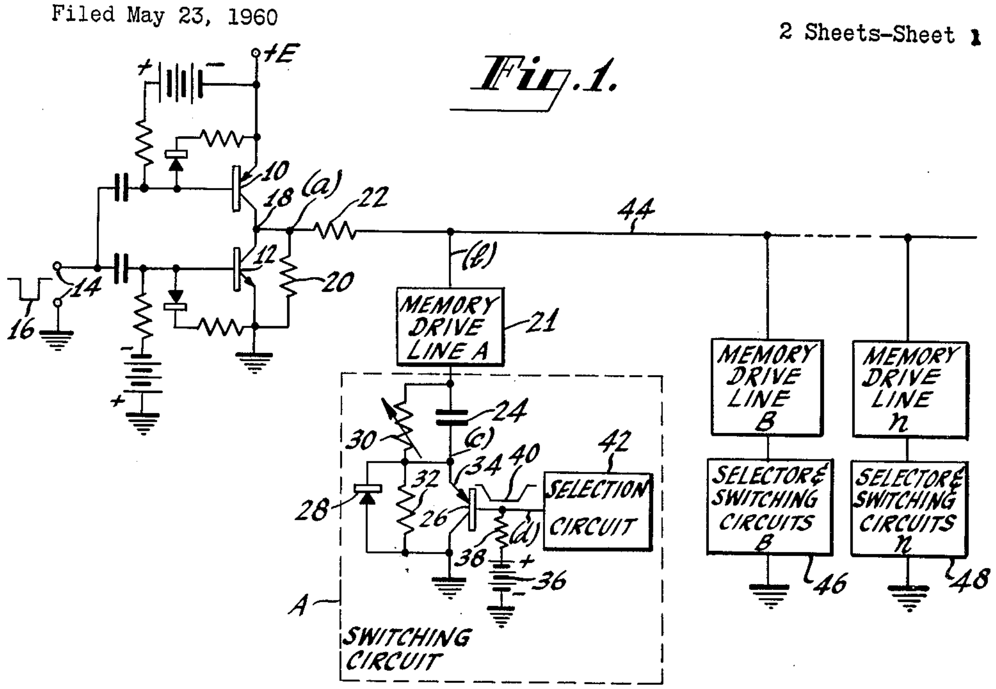
Fig. 1.
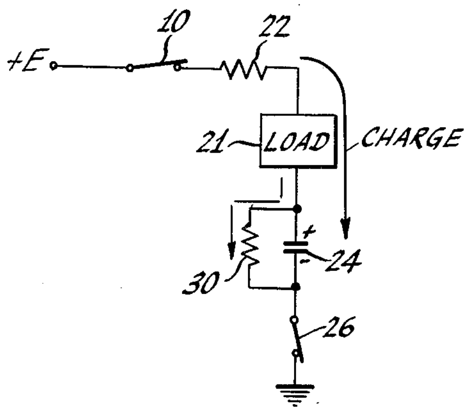
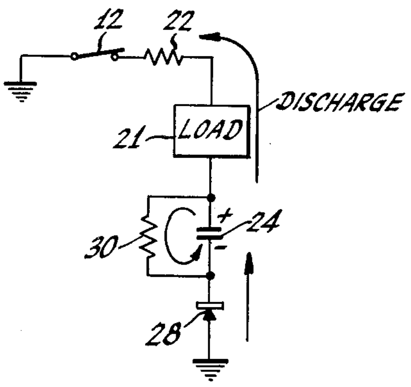
Fig. 2a. Fig. 2b.
INVENTOR.
WILLIAM G. RUMBLE
BY John V. Regan
ATTORNEY March 13, 1962 W. G. RUMBLE 3,025,411

DRIVE CIRCUIT FOR A COMPUTER MEMORY

Filed May 23, 1960 2 Sheets-Sheet 2

INVENTOR.
WILLIAM G. RUMBLE
BY John V. Regan
ATTORNEY

United States Patent Office 3,025,411
Patented Mar. 13, 1962

3,025,411

DRIVE CIRCUIT FOR A COMPUTER MEMORY

William G. Rumble, Van Nuys, Calif., assignor to Radio Corporation of America, a corporation of Delaware Filed May 23, 1960, Ser. No. 31,192
4 Claims. (Cl. 307—88.5)

Figure 3:
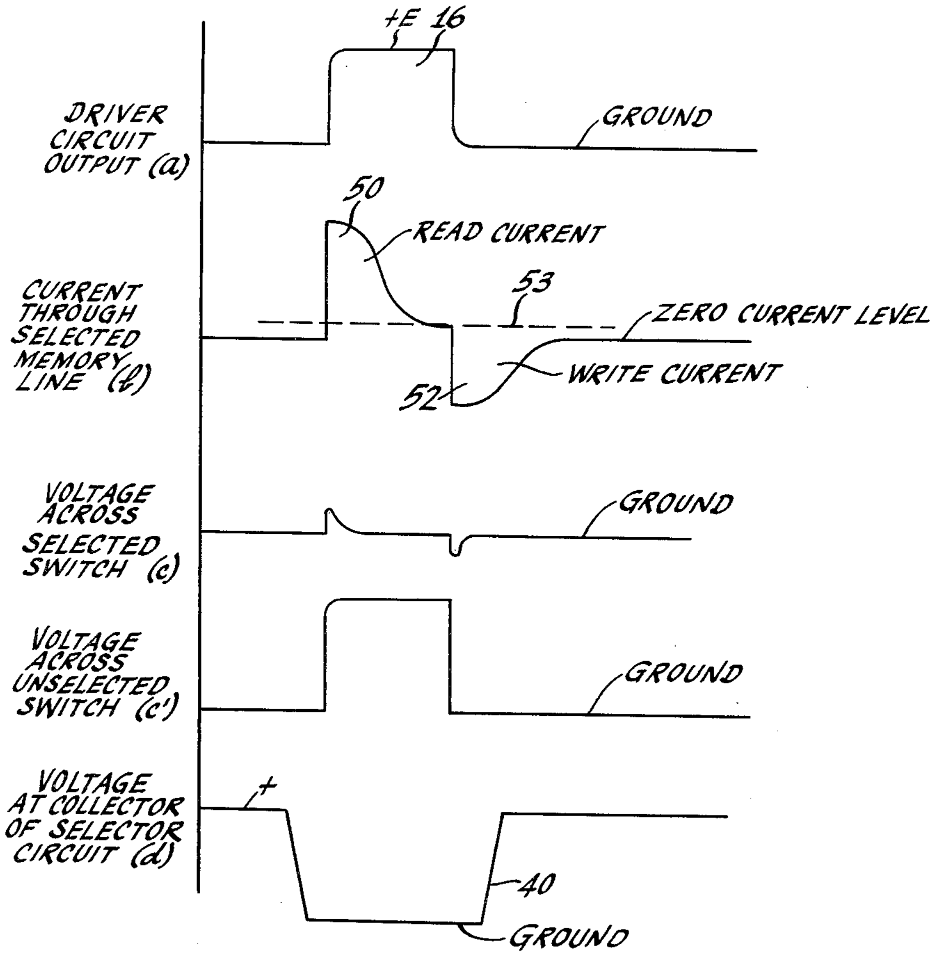

The invention described in this application is a new and improved circuit for applying current pulses of positive and negative polarity to a selected one of a number of loads. The invention is particularly useful in random access, magnetic core memories.

The circuit of the invention includes, in series, a voltage source, a first switch, a charge storage element, a load and a second switch which may be unidirectional. In memory applications, the load may include one or more magnetic cores. The circuit also includes a third switch effectively in shunt with the first switch and source, and a unidirectionally conducting element connected in shunt with the second switch and poled to conduct current in the opposite direction from that conducted by the second switch. When the first and second switches are closed, current flows through the load to charge the storage element. If, after the storage element is charged, the first switch is opened and the third one closed, the storage element discharges through the unidirectionally conducting element, load, and third switch. Current flows through the load in one direction during the charging of the storage element and in the opposite direction during the discharging of the storage element.

An important feature of the invention is a means in the circuit for controlling the relative amplitudes of the charge and discharge currents applied to the load. This is highly desirable in certain computer applications as a means for controlling the degree of switching of a magnetic core in a memory. In a preferred embodiment, this means includes an impedance element connected across the charge storage element which effectively increases the current through the load during the charging of the storage element and decreases the current through the load during the discharging of the storage element.

The invention will be described in greater detail by reference to the following description taken in connection with the accompanying drawing in which:

FIG. 1 is a block and schematic circuit diagram of a preferred form of the present invention;

FIGS. 2*a* and 2*b* are equivalent circuits showing the charging and discharging of the storage capacitor of FIG. 1; and FIG. 3 is a drawing of waveforms present at various places in the circuit of FIG. 1.

The driver portion of the circuit of FIG. 1 includes a PNP transistor 10 connected in series with an NPN transistor 12. A pair of input terminals 14 to which a negative-going driving pulse 16 may be applied, is capacitively coupled to the bases of the transistors. Both transistors are normally cut-off and the common collector connection 18 is therefore normally maintained at ground potential by resistor 20.

A memory drive line A, shown as a block 21, is connected to the common collector terminal 18 through a current limiting resistor 22. The drive line, as is well understood, may consist of windings on magnetic core memory elements. The windings are normally connected in series and each winding appears on a different core. The read and write currents for the magnetic cores are applied to these windings.

A charge storage element, capacitor 24, and a switch, PNP transistor 26 are connected in series with the memory drive line A. A unidirectionally conducting element, diode 28, is connected across the transistor and is poled to conduct current in a direction opposite to the current conducted by the transistor.

Capacitor 24 is shunted by a resistor 30 which may be fixed, or adjustable as shown. The purpose of this resistor, as explained in more detail later, is to control the relative amplitudes of the read and write currents applied to the memory drive line A. A second resistor 32 is connected in shunt across the transistor 26. This resistor is of relatively large value and it normally maintains the emitter 34 at ground potential.

Transistor 26 is normally maintained cut-off by a reverse bias positive voltage applied from source 36 through resistor 38 to the base of the transistor. The transistor is turned on by a negative pulse 40 applied to the base from selector circuit 42.

There are a number of other memory drive lines connected to the same line 44 as memory drive line A. Two of these legended "Memory Drive Line B" and "Memory Drive Line $\eta$" are shown. A selector switching circuit is connected to each drive line. This is shown schematically in the figure at blocks 46 and 48. Each of these blocks is identical with the circuit shown in schematic and block form in the dashed box A.

In the discussion of the operation of the circuit of FIG. 1 which follows, FIGS. 1, 2, and 3 should be referred to. A negative pulse 16 is periodically applied to transistors 10, 12. This pulse drives transistor 10 to saturation and transistor 12 to cut-off. The potential at point 18 therefore rises to substantially the supply voltage +E as is shown in FIG. 3*a*. As already mentioned, transistor 26 of the switching circuit is normally cut-off so that capacitor 24 cannot charge to any appreciable extent. The voltage at point C across the transistor 26 is as indicated in FIG. 3*c'*.

Assume now that a negative selection pulse 40 as shown in more detail in FIG. 3, is applied to transistor 26, and during the period of the application of the pulse, a negative pulse 16 is applied to input terminals 14. The negative pulse 16 causes transistor 10 to conduct heavily and terminal 18 rises to +E. The capacitor 24 now charges through conducting transistor 26 and current limiting resistor 22. The equivalent circuit is as shown in FIG. 2*a*. The purpose of resistor 22, as the name implies, is to limit the peak current through the memory line and also to control the charging time of the storage capacitor 24. The current pulse through the memory drive line during the capacitor charge interval is as shown at 50 in FIG. 3*b*. This is the read current pulse.

When pulse 16 terminates, its lagging edge appears as a short positive pulse applied to the bases of transistors 12 and 10. This is due to the differentiating action of the input circuit. The positive pulse drives transistor 12 into conduction and transistor 10 to cut-off. The voltage at point 18 therefore changes from +E to ground. Capacitor 24, which was charged during the interval that transistor 10 conducted, now discharges. The discharge circuit for the capacitor includes diode 28, memory drive line A and resistor 22. The equivalent circuit is shown in FIG. 2*b*. The discharge of the capacitor is, of course, in a direction opposite to its charge so that a pulse of opposite polarity is now applied to the drive line. This is the pulse 52 legended "Write Current" shown in FIG. 3*b*. The average direct current level is indicated by the dashed line 53.

In the equivalent circuits of FIGS. 2*a* and *b*, transistor 10 is shown as a switch 10, transistor 26 as a switch 26 and transistor 12 as a switch 12. All other elements in these figures are legended similarly to the same elements in FIG. 1.

In the memory application contemplated for the circuit shown in FIG. 1, during the read current cycle all magnetic cores on a selected drive line are driven to saturation in one direction. During the write current cycle, however, in order to increase the computer speed, the cores are only partially switched. It is therefore necessary that the write current pulse amplitude be smaller than the read current pulse amplitude. It is also desirable to be able to control the relative amplitude of the write current pulse so as to be able to control the degree of partial core switching. The resistor 30 enables this to be done. As can be seen in FIG. 2*a*, during the charge interval the load current has two paths in which to flow, one the resistor 30 and the other the charge capacitor 24. Accordingly, the resistor 30 effectively increases the current through the load. On the other hand, during the discharge interval, the capacitor 24 is the current source and part of the current discharged by the capacitor is bypassed through resistor 30. Accordingly, during the discharge interval, the effect of the resistor is to decrease the current through the load. It can readily be seen that as the resistance of the resistor 30 is increased, the difference between read and write current amplitudes decreases and as the resistance 30 decreases (within limits) the difference between read and write current amplitudes increases.

Another important feature of the invention is that the selector pulse 40 need not be of critical shape or time duration. As can be seen in FIG. 3*d*, this pulse can start before pulse 16 starts and can end after pulse 16 ends. Alternatively, pulse 16 can end at the same time as or after the read current pulse ends. It is not necessary for pulse 40 to be present during the write cycle since the write pulse is conducted by the diode 28 and not the transistor. An advantage of using a shorter selector pulse is that selector circuit recovery time limitations are reduced and higher operating speeds thereby made possible.

The circuit described is capable of driving a relatively large current pulse through a relatively low impedance load. The operating speed is high, of the order of one microsecond or so per read-write cycle.

A practical circuit according to the present invention may have circuit components of the following values. These are given merely by way of example and are not meant to be limiting.

| | | |
|---|---|---|
| Resistor **30** | ohms | 220 |
| Resistor **32** | do | 33,000 |
| Resistor **22** | do | 10 |
| Resistor **20** | do | 10,000 |
| Capacitor **24** | micromicrofarads | 4,800 |
| +E | volts | 30 |

What is claimed is:

1. A circuit for driving a bidirectional current pulse through a load comprising, in combination, a charging circuit includng a charge storage element, a first switch, and a voltage source in series with the load; a second switch in series with the storage element and load which, when closed, permits the charging circuit to charge the storage element through the load; a discharging circuit for the storage element including a third switch effectively in shunt with the first switch and source, and a unidirectionally conducting element in shunt with the second switch and poled to conduct current in a direction opposite to that of current conducted by the second switch, whereby, when the second switch is closed and, during the period the second switch is closed, the first and third switches are closed and opened in succession, the storage element charges and discharges through the load.

2. A circuit for driving a bidirectional current pulse through a load comprising, in combination, a charging circuit including a charge storage element, a first switch, and a voltage source in series with the load; a unidirectional second switch in series with the storage element and load which, when closed, permits the charging circuit to charge the storage element through the load; a discharging circuit for the storage element including a third switch effectively in shunt with the first switch and source; and a unidirectionally conducting element in shunt with the second switch and poled to conduct current in a direction opposite to that of current conducted by the second switch, whereby, when the second switch is closed and, during the period the second switch is closed, the first and third switches are successively closed and opened, the storage element charges and discharges through the load; and means associated with said storage element for controlling the amplitudes of the charging and discharging currents.

3. A circuit for driving a bidirectional current pulse through a load comprising, in combination, a charging circuit including a charge storage element, a first switch, and a voltage source in series with the load; an impedance connected across said charge storage element for controlling the charge and discharge currents of the charge storage element; a unidirectional second switch in series with the storage element and load which, when closed, permits the charging circuit to charge the storage element through the load; a discharging circuit for the storage element including a third switch effectively in shunt with the first switch and source, and a unidirectionally conducting element in shunt with the second switch and poled to condut current in a direction opposite to that of current conducted by the second switch, whereby, when the second switch is closed and, during the period the second switch is closed, the first and third switches are closed and opened in succession, the storage element charges and discharges through the load.

4. A circuit for driving a bidirectional current pulse through a load comprising, in combination, a charging circuit including a charge storage element, a first switch, and a voltage source in series with the load; a resistor connected across said charge storage element; a unidirectional second switch in series with the storage element and load which, when closed, permits the charging circuit to charge the storage element through the load; a discharging circuit for the storage element including a third switch effectively in shunt with the first switch and the voltage source, and a unidirectionally conducting element in shunt with the second switch and poled to conduct current in a direction opposite to that of current conducted by the second switch, whereby, when the second switch is closed and, during the period the second switch is closed, the first and third switches are successively closed and opened, the storage element charges and discharges through the load.

References Cited in the file of this patent

UNITED STATES PATENTS

| | | |
|---|---|---|
| 2,596,142 | Gerwin | May 13, 1952 |
| 2,608,654 | Street | Aug. 26, 1952 |
| 2,960,681 | Bonn | Nov. 15, 1960 |